United States Patent [19]

Sendo et al.

[11] 4,315,176
[45] Feb. 9, 1982

[54] ELECTRIC MOTOR

[75] Inventors: Masaaki Sendo; Kinzo Suzuki, both of Nakatsugawa, Japan

[73] Assignee: Mitsubishi Denki Kabushiki Kaisha, Tokyo, Japan

[21] Appl. No.: 62,242

[22] Filed: Jul. 30, 1979

[30] Foreign Application Priority Data

Jan. 25, 1978 [JP] Japan ............................. 53-7420

[51] Int. Cl.³ ............................................. H02K 7/10
[52] U.S. Cl. ....................................... 310/83; 310/43; 310/89
[58] Field of Search .................. 310/43, 83, 89, 47, 310/50

[56] References Cited

U.S. PATENT DOCUMENTS 3,521,095 7/1970 Russo ................................. 310/83
3,824,684 7/1974 Wheeler ............................ 310/43
4,087,709 5/1978 Haydon ............................. 310/83
4,152,612 5/1979 Endo .................................. 310/83

FOREIGN PATENT DOCUMENTS 51-39723 9/1976 Japan .

Primary Examiner—Donovan F. Duggan
Attorney, Agent, or Firm—Wenderoth, Lind & Ponack

[57] ABSTRACT

The disclosed fan motor includes a bracket encircling a stator and reduction gears of the conventional structure disposed within a gear box. The bracket is formed of sheet metal to include various holes while the gear box is moulded with an electrically insulating synthetic resinous material to be integral with the bracket by filling the holes with the resinous material upon moulding the gear box. Also the gears include respective shaft directly journaled by their bearings moulded with the resinous material.

8 Claims, 14 Drawing Figures

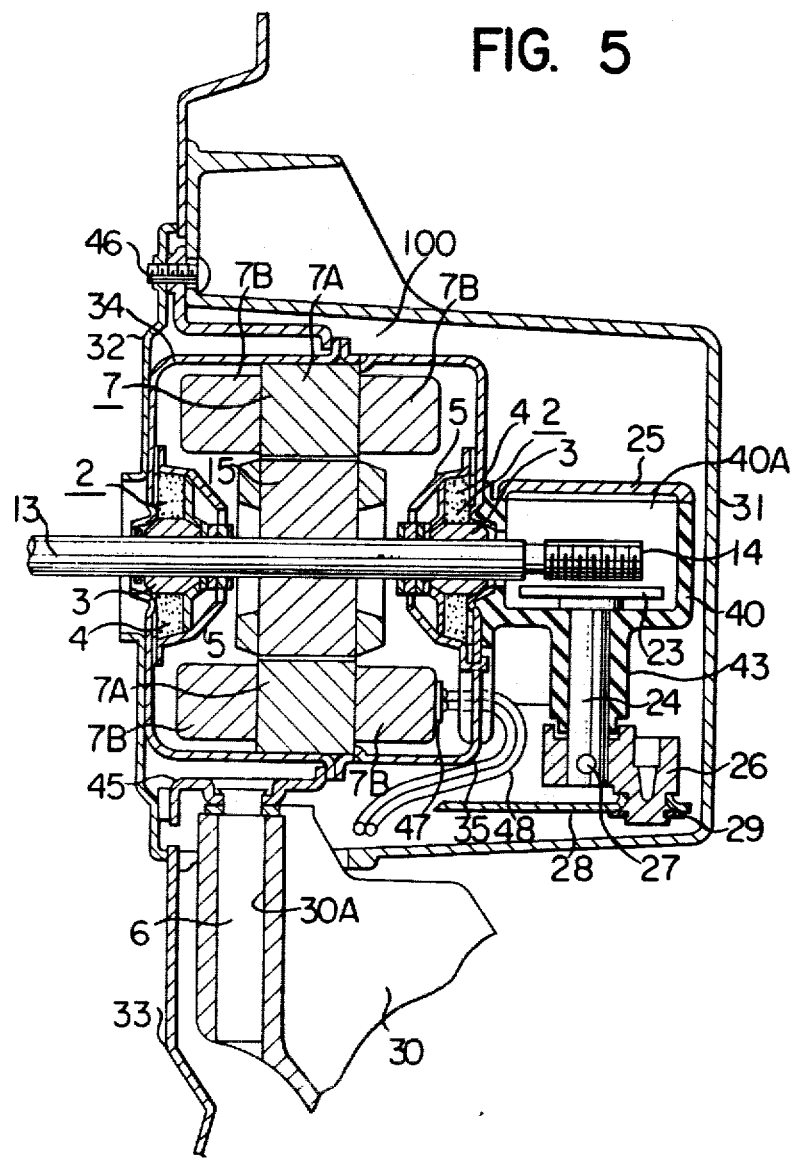

ELECTRIC MOTOR

BACKGROUND OF THE INVENTION

This invention relates to an electric motor and more particularly to an electric motor including a reduction gear mechanism constituted by a variable speed gearing accomodated in a gear box, such as in an electric fan.

Conventional electric motors for fan have had the motor bracket and the reduction gear box formed into a unitary structure by die-casting aluminum. A mould for moulding such a unitary structure is inevitably complicated and the number of components forming the mould has become large while the die-casting operation has been because the moulding material used is aluminum, the moulding as a moulding material involved is aluminum, a moulding temperature is high which has lowered the accuracy of the castings resulting in the necessity of machining the castings.

Accordingly, it is an object of the present invention to provide a new and improved electric motor having high dimensional accuracy sufficient to eliminate the necessity of machining the product as die cast and which has good mass producibility which makes it inexpensive.

SUMMARY OF THE INVENTION

The present invention provides an electric motor comprising a frame including a bearing unit, a bracket including a bearing unit, a stator encircled by the frame and the bracket interconnected, a rotary motor shaft rotatably mounted so as to extend rotatably through both bearing units and including one end portion provided with a first gear, a gear box moulded of an electrically insulating synthetic resinous material and integrally fixed to the bracket, and a second gear disposed in the gear box and driven by the first gear.

BRIEF DESCRIPTION OF THE DRAWINGS

The present invention will become more readily apparent from the following detailed description taken in conjunction with the accompanying drawings in which:

FIG. 5 is a longitudinal sectional view of one embodiment of the electric motor of the present invention;

Throughout the Figures like reference numerals designate identical or corresponding components.

DESCRIPTION OF THE PREFERRED EMBODIMENTS

Figure 1:
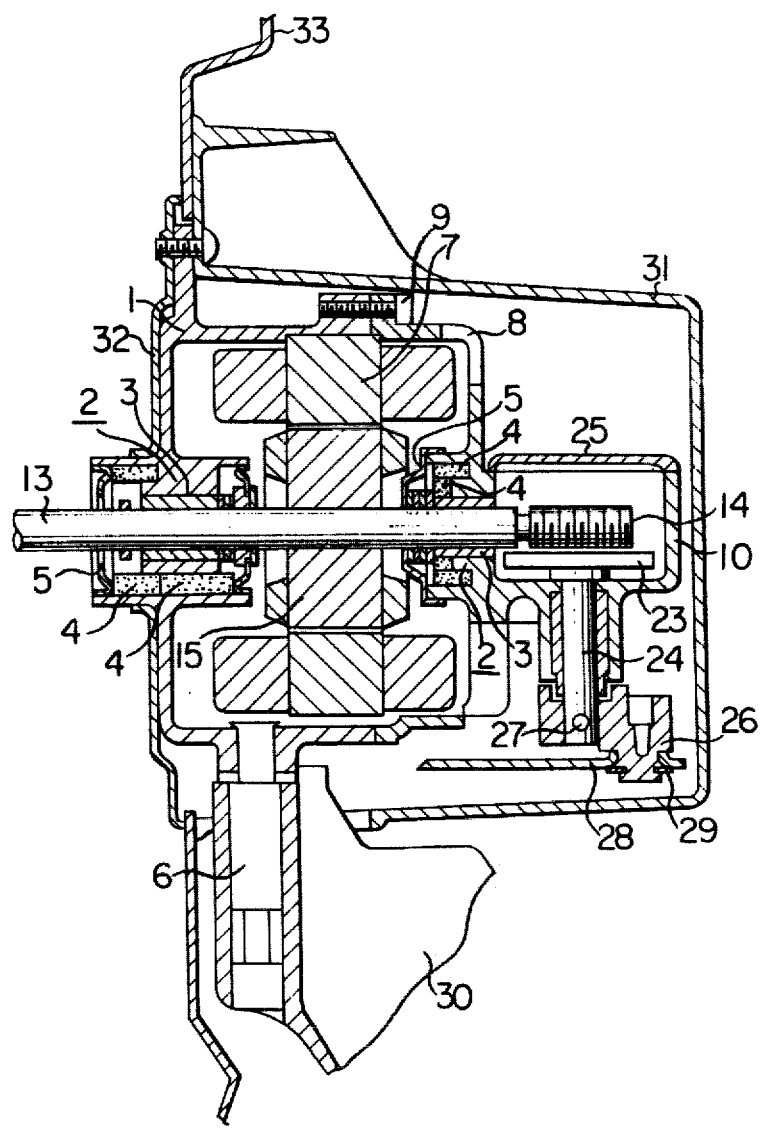
FIG. 1 is a longitudinal sectional view of a conventional electric motor with parts illustrated in elevation.

Referring now to FIGS. 1 through 4 of the drawings, there is illustrated a conventional electric motor for a fan. In the arrangement illustrated a frame 1 formed by die casting aluminum is provided on the central portion with a bearing unit 2 having a bearing 3 forced into the bearing unit 2 and a felt piece 4 disposed in the bearing unit 2 and fixed in place by a felt gland 5, the felt piece including a lubricating oil. A supporting shaft 6 for the electric motor is fixedly fitted into the lower portion of the frame 1 and a stator 7 is rigidly fitted into the frame 1.

A bracket 8 also formed by die casting aluminum is fixedly secured to the frame 1 by means of screws 9 so as to cover one side of the stator 7 and includes a gear box 10 formed integrally therewith. The bracket 9 is provided at the central portion with a bearing unit 2 the same as the frame 1. The bearing unit 2 is composed of a bearing 3, a felt piece 4 disposed therein coaxial with the bearing 3 and a felt gland 5 for holding the felt piece 4 in place.

Figure 4:
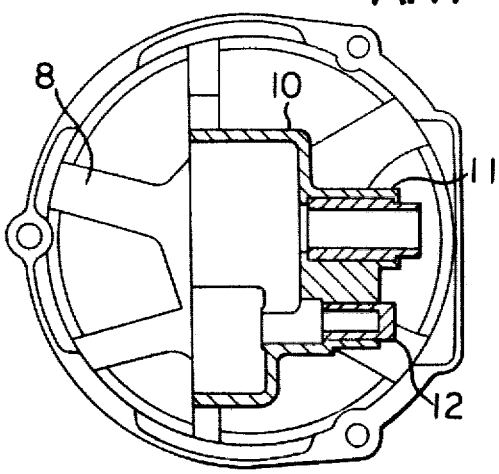
FIG. 4 is a sectional view of the gear box and bracket taken along the line IV—IV of FIG. 3 and viewed in the direction of the arrow.

As best shown in FIG. 4, a crank bearing 11 and a vertical bearing 12 are inserted into the gear box 10 and as best shown in FIG. 1, a rotary motor shaft 13 is rotatably mounted in and supported by both bearings 2. The rotary shaft 13 has one end portion extending into the gear box 10 and provided with a worm 14 and the other end provided with a plurality of rotatable fan blades (not shown). A rotor 15 is rigidly fitted onto the rotary motor shaft 13 within the stator 7 with a narrow gap therebetween.

Figure 2:
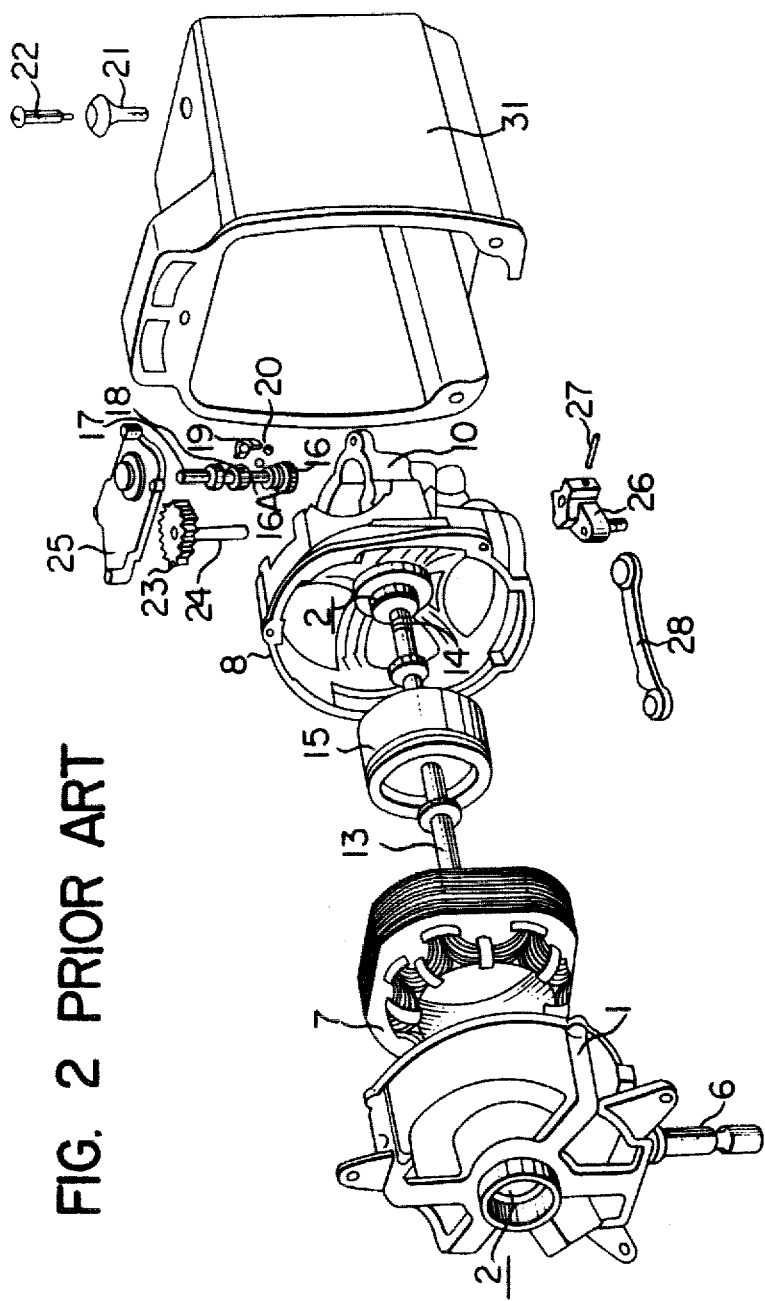
FIG. 2 is an exploded perspective view of the arrangement shown in FIG. 1.
Figure 3:
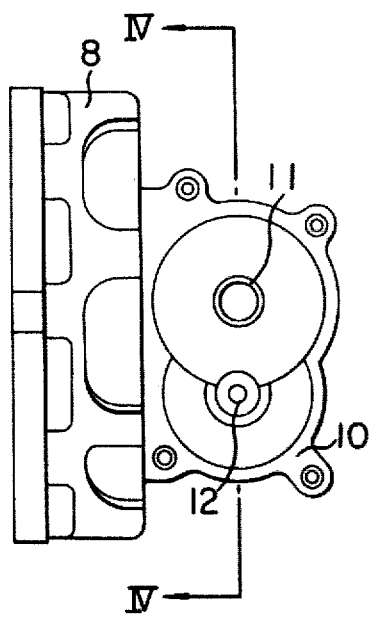
FIG. 3 is a plan view of the bracket and gear box shown in FIGS. 1 and 2.

Disposed within the gear box 10 is a worm gear 16 mounted on a relatively small shaft 16A and engaged with the worm 14. As shown in FIG. 2, a vertical hollow shaft 17 has a spur gear 18 and has the small shaft 16A loosely fitted thereonto. A clutch spring 19 acts to cause a pair of balls 20 to engage the worm gear 16 with and disengage it from the vertical shaft 17 under the control of an oscillation switching knob 21 secured to the vertical shaft 17 by a screw 22. The knob 21 is vertically movable to effect the engagement and disengagement between the worm gear 16 and the vertical shaft 17. The spur gear 18 meshes with a spur gear 23 to reduce the rotational speed and is mounted on an upper end of a crank 24 rotatably extending through the crank bearing 11.

The gear box 10 accommodates therein the components as described above and includes an upper open end which is closed with a cover 25.

As shown in FIGS. 1 and 2, a crank 26 is fixedly secured to the lower end portion of the crank shaft 24 by a pin 27. A connecting rod 28 is rotatably carried at one end by the crank 26 and a washer 29 and is rotatably fitted at the other end onto a protrusion (not shown) disposed on a neck piece 30 (see FIG. 1).

The neck piece 30 has the supporting shaft 6 fitted thereinto to support rotatably the main body of the electric motor. The main body of the electric motor includes a rear portion covered by a protective cover 31, and a front surface provided with a front cover 32 to which a guard 33 is attached to cover the rotatable blades (not shown).

In operation an alternating current flows through the stator 7 to rotate the rotary shaft 13. This rotation of the rotary shaft 13 causes the rotation of the rotatable blades (not shown) to ventilate a space where the electric motor is disposed. On the other hand, the worm 14 rotates the worm gear 16 to rotate the spur gear 17 through the vertical shaft 18 and also the spur gear 23 meshing with the spur gear 17. Therefore the crank shaft 24 is rotated at a reduced speed of rotation. During this rotation of the crank shaft 24 a fulcrum for the crank 26 is moved to oscillate or vibrate the electric motor about the axis of the supporting shaft 6. This oscillating movement can be stopped by disabling a clutch (not shown) by the oscillation switching knob 22.

In conventional electric motors such as shown in FIGS. 1 to 4, both the bracket 8 and the gear box 10 have been formed as follows: The crank shaft 24 and the vertical shaft 18 have been preliminarily disposed in place within an associated mould, and then both the bracket 8 and the gear box 10 have been cast together in the mould after which the bearing 3 for the bracket 8 is forced into a predetermined portion of the resulting casting.

Therefore the mould has been complicated and the die casting operation has been troublesome resulting in expensive castings. Also because the moulding temperature approximates 800° C., the castings have had low accuracy and large surface roughness. Therefore, the castings have been forced to be machined by a machine tool exclusively used for centering thereof.

From the foregoing it is seen that the bracket for conventional electric motors is required to be machined after the die casting which results in a high cost of equipment and a poor mass producibility and hence expensive products.

Referring now to FIG. 5, there is illustrated one embodiment of the electric motor of the present invention. In the arrangement illustrated a pair of bearing unit 2 are disposed in spaced aligned relationship. Each of the bearing units 2 includes a bearing 3, a felt piece 4 encircling the bearing 3 and including a lubricating oil for the bearing 3 and a felt gland 5 for fixing the felt 4 in place.

A supporting shaft 6 for an electric motor is fitted into a support member 45 disposed on a lower portion of a frame 34 as will be described hereinafter and a stator 7 is fitted into the frame 34. The stator 7 includes a stator core 7A and a stator coil 7B. A rotary shaft 13 for the electric motor is rotatably supported in both bearing units 2 and extends rotatably through the bearings 3. The rotary motor shaft 13 has one end portion provided with a worm 14 and the other end provided with a plurality of rotatable fan blades (not shown) while a rotor core 15 is rigidly fitted onto the rotary motor shaft 13 facing the stator 7 with a narrow gap therebetween.

Within a gear box 40 which will be described later, the worm 14 engages a worm gear identical to the worm gear 16 and is operatively coupled to components identical to the vertical shaft 17, the spur gear 18, the clutch spring 19, the balls 20 and the spur gear 23 as shown in FIG. 2 in the same manner as described above in conjunction with FIG. 2 although those components are not illustrated except for the spur gear 23. The worm gear is called a first gear and the spur gear 23 is called a second gear.

Further, an oscillation switching knob such as shown by 21 in FIG. 2 is operatively coupled to the component identical to the vertical shaft 17 in the same manner as described above in conjunction with FIG. 2.

As shown in FIG. 5, the gear box 40 includes an upper open end 40A closed with a cover 25 formed of any suitable synthetic resinous material.

As in the arrangement shown in FIGS. 1 and 2, the spur gear 23 is mounted to one end of a crank shaft 24 rotatably extending through a crank bearing 43. A crank 26 is fitted onto the crank shaft 24 at the other end and is fixed thereto through a pin 27. Then a connection rod 28 is rotatably carried at one end on the crank 26 and a washer 29 and rotatably fitted at the other end into a protrusion (not shown) disposed on a neck piece 30 to be connected thereto. The neck piece 30 includes a circular opening 30A into which the supporting shaft 6 is fitted whereby the same rotatably supports the main body 100 of the electric motor. The main motor body 100 includes a rear portion covered by a protective cover 31 and a rear surface to which a front cover 32 is attached. The front cover 32 is provided with a guard 33 for covering the rotatable blades (not shown) as described above.

Figure 6:
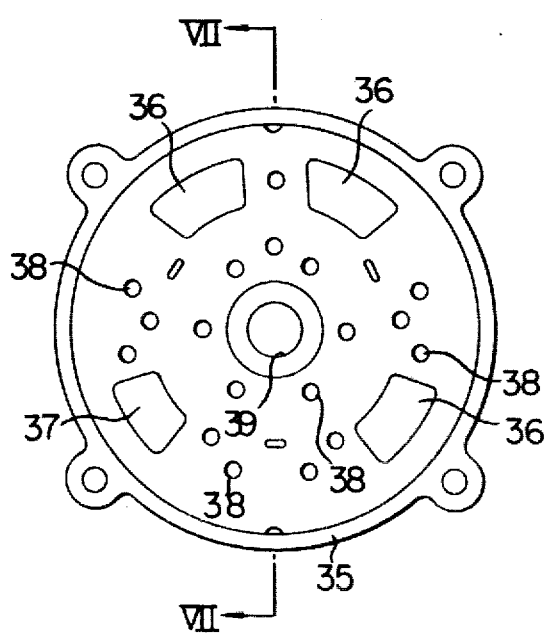
FIG. 6 is a front view of the bracket shown in FIG. 5.
Figure 7:
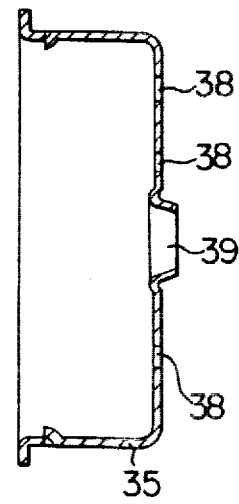
FIG. 7 is a longitudinal elevational sectional view of the bracket taken along the line VI—VI of FIG. 6 and viewed in the direction of the arrow.

The frame 34 is formed into a cup by pressing and the associated bearing unit 2 is disposed on the central portion of a bottom being held within the bearing gland 5. Also suitable sheet metal is pressed into a cupshaped bracket 35. As shown in FIGS. 6 and 7, the cupshaped bracket 35 is provided at the bottom with a plurality of vent holes 36, a lead hole 37, a plurality of small holes 38 and a central hole 39. The other bearing unit 2 is partly fitted into and fixed to the central hole 39 by means of the mating bearing gland 5, as shown in FIG. 5.

Figure 8:
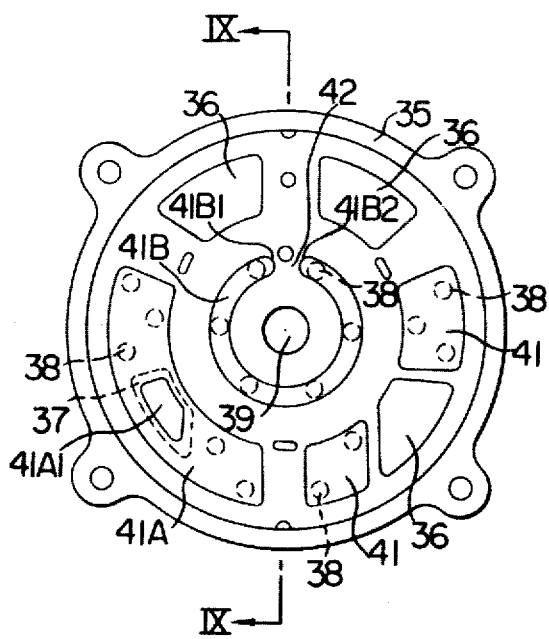
FIG. 8 is a front view of the combined bracket and gear box shown in FIG. 5.
Figure 9:
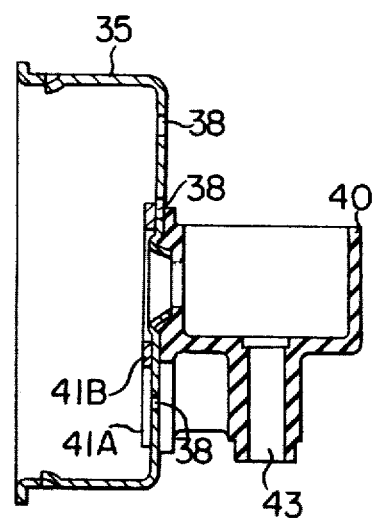
FIG. 9 is a longitudinal elevational sectional view of the bracket and gear box taken along the line IX—IX of FIG. 8 and viewed in the direction of the arrow.
Figure 10:
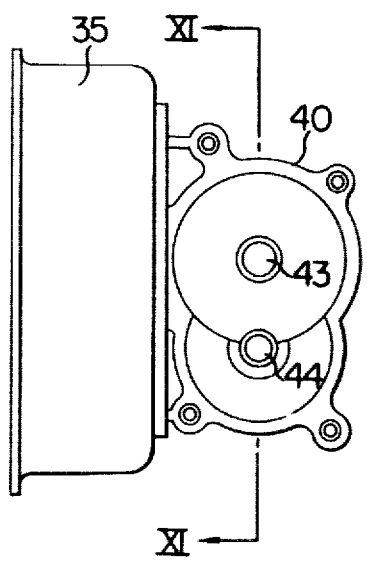
FIG. 10 is a front view of the bracket and gear box shown in FIG. 8.
Figure 11:
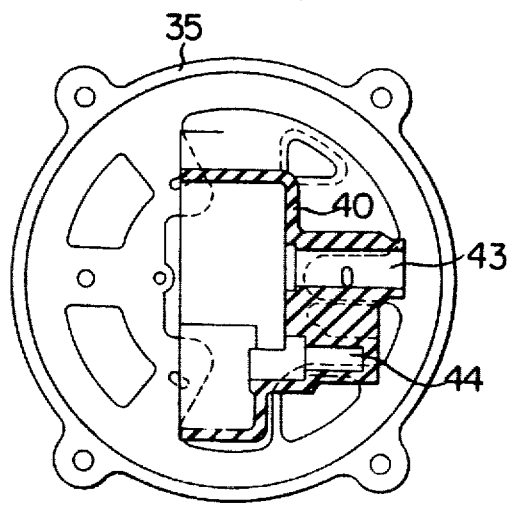
FIG. 11 is a sectional view of the bracket and gear box taken along the line XI-IX of FIG. 10 and viewed in the direction of the arrow with parts illustrated in plan.
Figure 13:
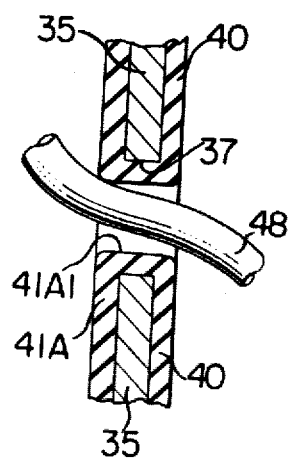
FIG. 13 is an enlarged side elevation view illustrating in section the lead portion shown in FIG. 5.

The gear box 40 is disposed on the outside of the bottom of the bracket 35 to form a unitary structure with the latter. The gear box 40 is formed of an electrically insulating synthetic resinous material, for example, polyacetal. It is to be understood that the present invention is not restricted to the use of polyacetal and that any suitable electrically insulating synthetic resinous material may be used. As shown in FIGS. 8 and 9, the gear box 40 has a lateral wall rigidly attached to the outer bottom of the bracket 35 at points other than the vent holes 36, the lead hole 37 and the central hole 29 and the lateral wall includes a plurality of fixing portions 41, 41A and 41B extending from the lateral wall through the small holes 38 to form discrete portions on the inner bottom of the bracket 35. The fixing portions have a common predetermined thickness by which they project from the bracket 35 toward the stator 7. As best shown in FIG. 8, the fixing portion 41B is in the form of a segment of a circle with a predetermined diameter concentric with and located nearest to the central hole 39 through which the rotary motor shaft 13 extends rotatably. The segment of the circle 41B includes a pair of opposite ends 41B1 and 41B2 between which a small hole 42 is disposed to open on the adjacent felt piece 4 through an aligned hole disposed on the bottom of the bracket 35. Also the lead hole 37 includes a peripheral wall coated with a resinous layer extending from the lateral wall of the gear box 40 and continuous to the adjacent fixing portion 41A to leave an opening 41A1 as best shown in FIG. 13.

Also as best shown in FIG. 9, the crank bearing 43 and the vertical bearing 44 are moulded simultaneously with the moulding of the gear box 40, as parts of the latter.

The cover 25 is preferably of the same resinous material as the gear box 40.

As shown in FIG. 5, the front cover 32 and the protective cover 31 have one end of a support member 45 sandwiched therebetween, the three being connected together through a screw 46.

The frame 34 and the bracket 35 are connected with the open ends abutting each other. The supporting member has the other end abutting against the abutting portions of the frame 34 and the bracket 35.

Figure 12:
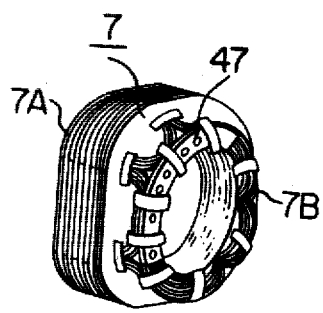
FIG. 12 is a perspective view of the stator shown in FIG. 5.

As shown in FIG. 12, a terminal block 47 is attached to that portion of the stator coil 7B adjacent to the lead hole 37 on the bracket 35 and a pair of leads 48 are connected to both ends of the stator coil 7B through the terminal block 47. The leads 48 extend through the hole 41A1 located within the lead hole 37 as best shown in FIG. 13 and for the purpose of supplying electric energy to the stator coil 7B.

The electric motor of the present invention as shown in FIGS. 5 to 12 is identical in operation to the conventional electric motor as shown in FIGS. 1 to 4. It is noted that the small hole 42 serves to permit lubricating oil to flow easily into the adjacent felt piece 4 upon oiling.

For moulding the gear box 40, the bracket 35 is first fixed in place within an associated mould (not shown) used with injection moulding process so as to leave a space in which the gear box 40 is moulded. Then an electrically insulating synthetic resinous material such as described above is poured into the mould to mould the gear box 40 integral with the bracket 35 as shown in FIGS. 8 and 9. It has been found that a moulding temperature can be about 200° C. The moulding of the gear box 40 as described above permits the use of a simple mould resulting in the simplification of the moulding operation. Also the resulting dimensional accuracy is high and aftermachining is not required. Further the bracket is formed of sheet metal and therefore has sufficient strength.

Also because the gear box with the crank and vertical bearings are moulded with an electrically insulating synthetic resinous material, it is not required to insert bearings made of a metal into a mould for die casting the gear box which has been previously necessary.

Also the stator increases the electric insulation because the terminal block 47 therefor is opposite and near to the fixing portion 41A made of the electrically insulating material.

Since the fixing portion 41B is disposed adjacent to the bearing unit 4 for the bracket 35 and so as to surround the rotary motor shaft 13, the strength is increased.

In addition, since the bottom of the bracket 35 includes a plurality of fixing portions formed of a synthetic resinous material disposed on one side thereof and the gear box 40 is formed of the same material disposed on the other side thereof to accommodate the spur gear 23 driven by the worm 14, the resulting moulding has a high quality and has neither cracks nor deformations. This result is also attributable to both the bracket 35 and the gear box 40 integrally fixed thereto through the resinous material extending through the small holes.

Furthermore, since the leads 48 from the stator coil 7B extend through the lead hole 37 covered with the electrically insulating resinous material, it is not required to provide the bracket 35 with a bush for protecting the leads.

Figure 14:
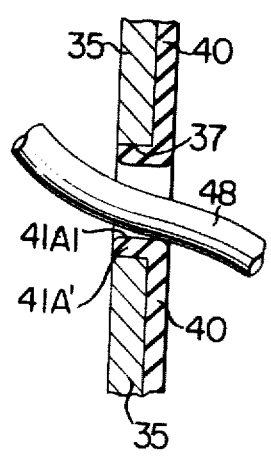
FIG. 14 is a view similar to FIG. 13 but illustrating a modification of the arrangement shown in FIG. 13.

As shown in FIG. 14, the fixing portion 41A' covering the inner wall of the lead hole 37 need not protrude from the bracket's bottom toward the stator.

While the present invention has been illustrated and described in conjunction with a few preferred embodiments thereof it is to be understood that numerous changes and modifications may be resorted to without departing from the spirit and scope of the present invention.

What we claim is:
1. An electric motor device comprising:
cup-shaped housing means having a first shaft bearing unit and a stator therein;
a shaft which is rotatable in said shaft bearing unit and has a rotor thereon rotatable within the stator;
a cup-shaped bracket member opening toward and fixed at the periphery thereof to said housing means and having defined in the bottom portion thereof a central hole and a plurality of fixing holes;
a second bearing unit disposed in said central hole and through which said shaft rotatably extends;
a gear box member formed of electrically insulating synthetic resin disposed on the outside of the bottom portion of said bracket member and housing the portion of the shaft extending beyond said second bearing unit, said gear box member including a gear bearing, and a fixing portion comprising a wall plate portion contacting the outside of said bottom portion of the bracket member, protrusions integral with and extending from said wall plate portion into said fixing hole, and a fixing plate portion integral with and bridging said protrusions and contacting the inside of said bottom portion of the bracket member, said wall plate portion and said fixing plate portion thereby sandwiching said bottom portion of the bracket member therebetween;
a first gear rigidly fixed to the end portion of said shaft within said gear box; and
a second gear rotatably supported by said gear bearing and engaging with said first gear.

2. An electric motor device comprising:
a cup-shaped frame member having defined in the bottom portion a first central hole;
a cup-shaped bracket member having defined in the bottom portion thereof a second central hole, and a plurality of fixing holes, said frame member and said bracket member opening toward each other and having peripheries attached to each other;
a first shaft bearing unit disposed in said first central hole;
a second shaft bearing unit disposed in said second central hole;
a shaft rotatably supported by said first and second bearing units and extending through said second bearing unit;
a rotor fixed to said shaft;
a stator mounted on the inside of said assembled frame and bracket members and surrounding said rotor;
a gear box member formed of electrically insulating synthetic resin disposed on the outside of the bottom portion of said bracket member and housing the portion of the shaft extending beyond said second bearing unit, said gear box member including a gear bearing, and a fixing portion comprising a wall plate portion contacting the outside of said bottom portion of the bracket member, a plurality of protrusions integral with and extending from said wall plate portion into said fixing holes, and a fixing plate portion integral with and bridging said protrusions contacting the inside of said bottom portion of the bracket member, said wall plate portion and said fixture plate portion thereby sandwiching said bottom portion of the bracket member therebetween;

a first gear rigidly fixed to the end portion of said shaft within said gear box; and a second gear rotatably supported by said gear bearing and engaging with said first gear.

3. An electric motor device as claimed in claim 1 or 2, wherein said plurality of fixing holes comprise a series of spaced holes substantially surrounding said second central hole in the bracket memer, and said fixing plate portion comprises an annular plate intgral with an bridging protrusions which extend into said series of holes, said annular plate substantially surrounding said shaft.

4. An electric motor device as claimed in claim 3, wherein said annular plate has the form of an open annulus with opposing ends and said bracket member further has a hole therein positioned between said opposing ends of said annular plate.

5. An electric motor device as claimed in claim 4, wherein said bracket member further has a lead hole in the bottom portion thereof, and said gear box further comprises an annular protrusion integral with and extending from said wall plate portion into said lead hole in intimate contact therewith, and an electric lead extending through said annular protrusion and supplying electric current to said stator.

6. An electric motor device as claimed in claim 4, wherein said gear bearing is formed of the synthetic resin integral with said gear box.

7. An electric motor device as claimed in claim 4, wherein said first and the second bearing unit each comprise a metal bearing and said bracket memer is formed of metal material.

8. An electric motor device as claimed in claim 7, wherein said metal material is sheet metal.

* * * * *